United States Patent

Amit (10) Patent No.: US 9,954,874 B2
(45) Date of Patent: Apr. 24, 2018

(54) DETECTION OF MUTATED APPS AND USAGE THEREOF

(71) Applicant: SKYCURE LTD., Tel Aviv-Yafo (IL)

(72) Inventor: Yair Amit, Tel Aviv (IL)

(73) Assignee: SYMANTEC CORPORATION, Mountain View, CA (US)

(*) Notice: Subject to any disclaimer, the term of this patent is extended or adjusted under 35 U.S.C. 154(b) by 35 days.

(21) Appl. No.: 14/876,804

(22) Filed: Oct. 6, 2015

(65) Prior Publication Data

US 2016/0099956 A1    Apr. 7, 2016

Related U.S. Application Data

(60) Provisional application No. 62/060,675, filed on Oct. 7, 2014.

(51) Int. Cl.
*H04L 29/06* (2006.01)
*G06F 21/56* (2013.01)

(52) U.S. Cl.
CPC ........ *H04L 63/1416* (2013.01); *G06F 21/563* (2013.01); *G06F 21/565* (2013.01); *H04L 63/123* (2013.01)

(58) Field of Classification Search
CPC ................................................. H04L 63/1416
See application file for complete search history.

(56) References Cited

U.S. PATENT DOCUMENTS

| 8,869,284 B1* | 10/2014 | Mao | G06F 21/563 |
| | | | 726/23 |
| 9,197,663 B1* | 11/2015 | Gilbert | G06F 3/04817 |
| 9,349,002 B1* | 5/2016 | Zhang | G06F 21/56 |
| 9,426,257 B1* | 8/2016 | Pashkov | H04L 67/42 |

(Continued)

OTHER PUBLICATIONS

Vigna, Giovanni, William Robertson, and Davide Balzarotti. "Testing network-based intrusion detection signatures using mutant exploits." Proceedings of the 11th ACM conference on Computer and communications security. ACM, 2004.*

(Continued)

*Primary Examiner* — Shawnchoy Rahman
(74) *Attorney, Agent, or Firm* — Patterson + Sheridan, LLP (57) ABSTRACT

System, method and product for detection of mutated apps and usage thereof. A method comprises obtaining features of an Application Under Check (AUC); comparing the features with sets of features of applications to determine a host application of the AUC; determining that the AUC is a mutated application of the host application, wherein said determined comprises comparing the AUC with the host application; and in response to said determining, performing a predetermined action. A server may be configured to perform the steps of collecting features relating to trusted applications, wherein the trusted applications are potentially useable as a basis for a mutated application, wherein the features are features that are indicative of a mutated versions of the trusted applications; and retaining the features in a repository, whereby collecting and retaining a list of positive signatures of trusted applications that are useful to approximately identify a host application of a mutated application.

19 Claims, 4 Drawing Sheets

(56) References Cited

U.S. PATENT DOCUMENTS

| | | | | |
|---|---|---|---|---|
| 2008/0034424 | A1* | 2/2008 | Overcash | G06F 21/55 |
| | | | | 726/22 |
| 2012/0042167 | A1* | 2/2012 | Marking | H04L 63/126 |
| | | | | 713/171 |
| 2012/0240236 | A1* | 9/2012 | Wyatt | G06F 21/564 |
| | | | | 726/25 |
| 2013/0097706 | A1* | 4/2013 | Titonis | G06F 21/56 |
| | | | | 726/24 |
| 2013/0185797 | A1* | 7/2013 | Zhou | G06F 21/52 |
| | | | | 726/23 |
| 2013/0276105 | A1* | 10/2013 | Hinchliffe | G06F 21/50 |
| | | | | 726/22 |
| 2013/0305368 | A1* | 11/2013 | Ford | G06F 21/568 |
| | | | | 726/23 |
| 2014/0006375 | A1* | 1/2014 | Forte | G06F 8/77 |
| | | | | 707/709 |
| 2015/0317475 | A1* | 11/2015 | Aguayo Gonzalez | G06F 21/55 |
| | | | | 726/23 |
| 2016/0099963 | A1* | 4/2016 | Mahaffey | H04L 63/1433 |
| | | | | 726/25 |

OTHER PUBLICATIONS

Zheng, Min, Mingshen Sun, and John CS Lui. "Droid analytics: a signature based analytic system to collect, extract, analyze and associate android malware." Trust, Security and Privacy in Computing and Communications (TrustCom), 2013 12th IEEE International Conference on. IEEE, 2013.*

* cited by examiner

DETECTION OF MUTATED APPS AND USAGE THEREOF

CROSS-REFERENCE TO RELATED APPLICATION

This application claims the benefit of U.S. Provisional Application No. 62/060,675 filed Oct. 7, 2014, entitled "DETECTION OF MUTATED APPS AND USAGE THEREOF", which is hereby incorporated by reference in its entirety without giving rise to disavowment.

TECHNICAL FIELD

The present disclosure relates to automatic analysis of applications, in general, and to automatic detection of mutated applications, in particular.

BACKGROUND

Malware is a long lasting problem in computers. Malware that reaches the device and executed has a potential of implementing malicious activities, such as data deletion, data hijacking, monitoring private activity and communications, impersonating the owner of the device, infecting other devices with malware, or the like.

Nowadays, solutions tend to rely on classical signatures models. In classical signatures models there are known signatures of malicious code, such as an entire app, module within an app, or the like. In some cases, the signature is an observable indicator for malicious code libraries in analyzed apps. This approach is able to identify a specific variant of malware as long as the code the signature relies on is not modified. Hence, it can be bypassed by malware-writers by merely changing the malicious code a bit, to avoid from being matched by the signature. Also, this approach requires prior knowledge of the existence of a malware. Hence, new malware that does not recycle code modules may not be identified by such an approach.

BRIEF SUMMARY

One exemplary embodiment of the disclosed subject matter is a method performed by a processor, wherein the method comprises: obtaining features of an Application Under Check (AUC); comparing the features with sets of features of applications to determine a host application of the AUC; determining that the AUC is a mutated application of the host application, wherein said determined comprises comparing the AUC with the host application; and in response to said determining, performing a predetermined action.

Another exemplary embodiment of the disclosed subject matter is a server having a processor, the server being connected to a network, the processor being adapted to perform the steps of: collecting features relating to trusted applications, wherein the trusted applications are potentially useable as a basis for a mutated application, wherein the features are features that are indicative of a mutated versions of the trusted applications; and retaining the features in a repository, whereby collecting and retaining a list of positive signatures of trusted applications that are useful to approximately identify a host application of a mutated application.

THE BRIEF DESCRIPTION OF THE SEVERAL VIEWS OF THE DRAWINGS

The present disclosed subject matter will be understood and appreciated more fully from the following detailed description taken in conjunction with the drawings in which corresponding or like numerals or characters indicate corresponding or like components. Unless indicated otherwise, the drawings provide exemplary embodiments or aspects of the disclosure and do not limit the scope of the disclosure. In the drawings.

DETAILED DESCRIPTION

One technical problem dealt with by the disclosed subject matter is identifying mutated applications.

In mobile and other app-based Operating Systems (OSs), there are app repositories from which apps may be downloaded to be installed on a client device. Some repositories are managed by the OS vendors who are constantly adding measures to make it harder for malware to be available in their official repositories, such as Apple™ AppStore and Google™ Play. Such repositories may be deemed as trusted repositories, as they are less likely to include malware apps, cracked apps, copyright-infringing apps, or the like.

A mutated app may be an app that is based on an existing app, also referred to as a host app, and is a variation thereof. The mutated app may be malware app which presents itself as a legitimate app. Additionally or alternatively, the mutated app may be a cracked version of an app using Digital Rights Management (DRM). As an example, some authors of mutated apps may take advantage of successful and known apps to spread their apps. In such a case, the mutated app may be a variation of legitimate and popular apps (e.g., Angry Birds™, Facebook™, etc.) which provides an added or changed functionality. The functionality may be to override a DRM, to hijack traffic, such as to serve advertisements that benefit the owner of the mutated app instead of the owner of the original, host app, to inject malicious functionality to the app, or the like.

In some exemplary embodiments, the practice of looking for signatures of bad/malicious logic (also referred to as negative signatures) may not be sufficient in case of mutated apps, as it requires a-priori identification of the mutated app or at least a portion of logic included therein.

In some exemplary embodiments, the disclosed subject matter may not rely on trying to identify the malicious code (e.g., negative signature of blacklisted apps or blacklisted code segments), which tends to keep changing by app authors who wish to evade such identification. Instead, the disclosed subject matter may be able to identify that the examined app is a mutated app: an app that generally tries to impersonate another apps, which is usually known and popular, but has a different (alternative or additive) functionality, which may potentially be malicious.

The disclosed subject matter may utilize a variety of ways to identify the "hosting app". Once identified, the disclosed subject matter may then check if it is different than the formal stream of software of the host app. This can be achieved by building a database of legitimate apps, referencing to trusted repositories or by utilizing crowdsourcing in order to automatically generate such a database.

In some exemplary embodiments, mutations of legitimate apps may have the same look-and-feel of the host app and potentially have a same general behavior. In some exemplary embodiments, the disclosed subject matter may utilize a positive signature of the host app that is expected to be persistent in mutated apps as well. It will be noted that the value of the persistent features may be different in mutated apps, however, as a set of features their value is either identical or similar to that of the original host app (e.g., no more than about 2% different, about 5% difference, about 10% difference, about 20% difference, or the like). Based on the identified host app, a comparison may be made between the host app and an App Under Check (AUC) to determine whether or not the AUC is the host app itself or a mutated app thereof.

It will be noted that the disclosed subject matter refers to mobile devices as an example only. The disclosed subject matter may be applied to any app-based devices, such as laptops, personal computers, tablet computers, or the like, and is not limited to mobile devices such as smart phones, Personal Digital Assistants (PDA), or the like.

Figure 1:
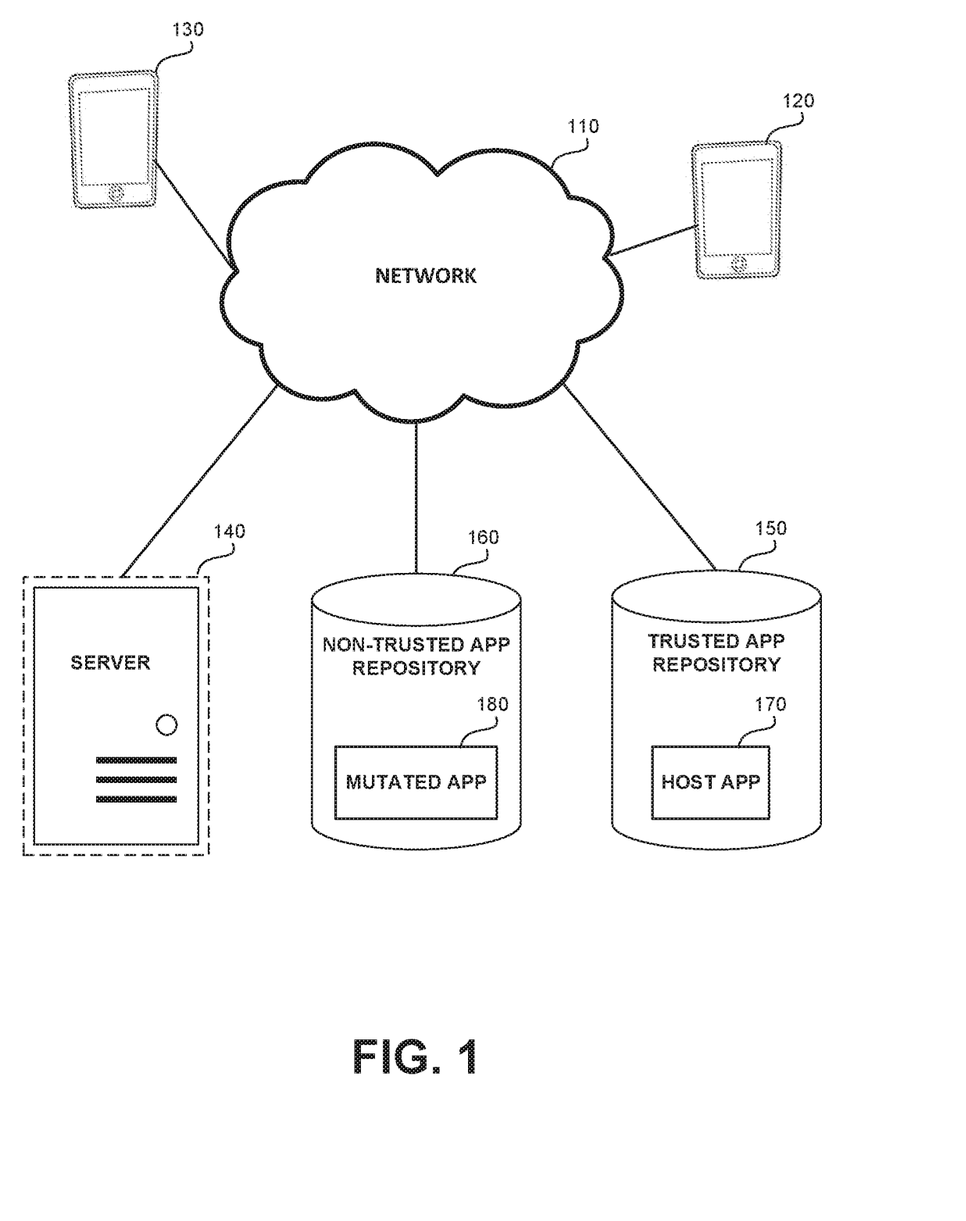
FIG. 1 shows an illustration of a computerized environment, in accordance with some exemplary embodiments of the disclosed subject matter.

Referring now to FIG. 1 showing an illustration of a computerized environment, in accordance with some exemplary embodiments of the disclosed subject matter.

In some exemplary embodiments, a Device 120 may be a computing device such as a computer, a laptop, a mobile computing device, a smart phone, a Personal Digital Assistant (PDA), or the like. Device 120 may be configured to download, install and execute applications. In some exemplary embodiments, Device 120 may be connected to a Network 110, such as a Local Area Networks (LAN), a Wide Area Network (WAN), an intranet, the Internet, or the like.

In some exemplary embodiments, Device 120 may access a repository to download and install an application. The repository may be, for example, an official repository of an OS vendor, such as Google Play™, a non-official repository, an application-dedicated web-site or application (e.g., an application store), one or more attachments in an e-mail, a direct link to a web resource retaining one or more apps, or any other repository allowing access and retrieval of at least one application. FIG. 1 exemplary illustrates two repositories—Trusted App Repository 150 and Non-Trusted App Repository 160. However, any number of repositories may exist, some of which may be deemed as "trusted" and others "non-trusted". In some embodiments, there may be a repository that is deemed "trusted". In such an embodiment, the repository that is trusted may be collected by the disclosed subject matter, such as using crowdsourcing techniques. Each repository may make available for download applications for devices, such as Device 120. In some exemplary embodiments, some of the applications may be distributed for free, while others may have a price and be downloadable by paying customers.

In some exemplary embodiments, Device 120 may access Non-Trusted App Repository 160 and download therefrom an application, such as Mutated App 180. Mutated App 180 may be a mutated version of Host App 170, such as a malware version posing as Host App 170, a cracked version of Host App 170, or the like. In some exemplary embodiments, a source code of Host App 170 may be available for third parties, such as in case of open source applications, thereby allowing third parties to easily create mutated versions of Host App 170, such as Mutated App 180. Additionally or alternatively, a mutated version may be created using a binary file of Host App 170.

In some exemplary embodiments, Device 120 may analyze a downloaded app to extract its features. The features may be used as a positive signature of an underlying host app which the app is based on, such as Host App 170 in case the app is Mutated App 180. For example, the features may include a title of the app, an icon of the app, a resource used by the app, names of files in the app, names of packages used in the app, an app UI scheme, an app UI layout, or the like. It will be noted that the positive signature may be an approximated signature which may be matched even when differences exists. In case, a host app is identified as the host app of the app, the two apps may be compared to determine whether app is the same as the host app or different therefrom. In some exemplary embodiments, the app may be analyzed to identify it as a new version of the host app, which is deemed part of the original software stream and not as a mutated app. In some exemplary embodiments, in case the app is identified as a mutated app, a predetermined action may be performed, such as notifying the user of Device 120, notifying an IT staff member associated with Device 120, blocking the app from being executed on Device 120, deleting the app from Device 120, reporting the app to the repository from which it was downloaded, reporting the app to an owner of the host app, such as to allow the owner to perform take down operations or legal actions, or the like.

In some exemplary embodiments, the features may be extracted by Device 120 and looked up in a features repository (not shown) retaining features of host apps, locally by Device 120. Additionally or alternatively, the features repository may be retained by Server 140 which may receive the extracted features from Device 120 and perform the lookup itself. In some exemplary embodiments, the downloaded app may be transferred to Server 140 or independently downloaded by Server 140 from the external source (e.g., Non-Trusted App Repository 160) and the features may be extracted by Server 140 itself. Additionally or alternatively, comparison between the downloaded app and the identified host app may be performed by Device 120 or by Server 140. In some exemplary embodiments, the comparison may be performed based on one or more additional features not used for the host app lookup. Additionally or alternatively, the comparison may be performed by comparing the executable files themselves by a computerized apparatus having both the downloaded app and the host app.

In some exemplary embodiments, Server 140 may maintain the features repository (not shown). In some exemplary embodiments, Server 140 may periodically update devices, such as Device 120, so that such devices may have a local copy of the features repository.

In some exemplary embodiments, Server 140 may periodically access trusted repositories, such as Trusted App Repository 150, to receive information about apps that are potentially host apps and update the features repository accordingly. In some exemplary embodiments, Server 140 may include in the features repository features of all apps in the trusted repositories. Additionally or alternatively, Server 140 may only retain features of popular apps that are more likely to be used as host apps for mutated apps, such as based on top 100 charts, top regional charts, top trending charts, or the like. In some exemplary embodiments, vendors of apps may indicate apps to be represented in the repository, such as proprietary software that may be subject to copyright infringement or be a potential target for cracking its DRM protection.

In some exemplary embodiments, the features repository maintained by Server 140 may be updated based on crowd-sourced information received from a plurality of devices, such as Device 120 and Device 130. Based on installation statistics, usage statistics or other statistical metrics, common apps may be identified and used as a basis for compiling the list of potential host apps. In some exemplary embodiments, using crowdsourced data may assist in identifying trending apps, new versions of existing apps which were recently released, or the like, and differentiating such applications which are likely to be genuine applications and not mutated apps.

In some exemplary embodiments, Server 140 may be cautious in trusting information received from a single device or from a small set of devices as a basis for defining the features repository, as a small number of devices may be malicious devices attempting to assist mutated apps to avoid being detected. In some exemplary embodiments, once a potential host app is detected based on the crowdsourced information, Server 140 may request from one or more devices to provide the features to be added to the repository. In some exemplary embodiments, quorum-based voting may be applied to avoid relying on information provided by malicious devices.

Figure 2:
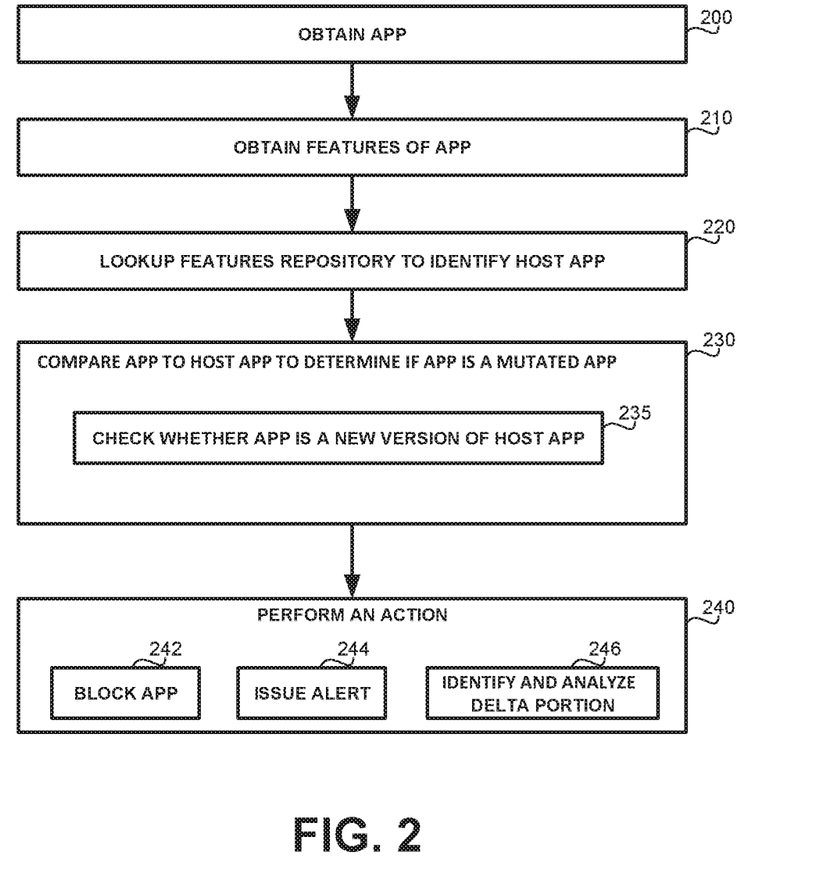
FIG. 2 shows a flowchart diagram of a method, in accordance with some exemplary embodiments of the disclosed subject matter.

Referring now to FIG. 2 showing a flowchart diagram of a method, in accordance with some exemplary embodiments of the disclosed subject matter.

In Step 200, an app may be obtained. In some exemplary embodiments, the app may be obtained by a device, such as 120 of FIG. 1. The app may be obtained from an app repository. In some exemplary embodiments, the app may be obtained from a non-trusted app repository, such as 160 of FIG. 1. The app may be obtained from an attachment of an e-mail, a link to a web resource, or any other repository of one or more applications. The app may be downloaded to the device to be installed and to allow execution of the app.

In Step 210, features of the app may be obtained. In some exemplary embodiments, the features may be extracted from the downloaded app by the device. Additionally or alternatively, the app may be transmitted to another computerized apparatus, such as a server, which may in turn perform the feature extraction. The features of the app may be features which are persistent in mutated versions of a host app. As an example, the features may be the following set: a name of the app (e.g., "title"), an icon of the app, names of packages in the app bundle, names of files in the app bundle, software libraries and Software Developers Kits (SDKs) used by the app, content of files in the app bundle or hashing thereof, a splash screen content of the app, an indicated app version, a vendor identifier, set of activities/services/broadcast receivers that are employed in the app, look & feel indicators (e.g. UI layout of the app), resources utilized by the app or the like. As another example, in Android™ operating system apps, the app itself may be provided in Android Application Package (APK) file format or in a similar format. The content of the APK file may be used also as features. As non-limiting example, the content of the APK which may be useful as features, may be "AndroidManifest.xml", "classes.dex", contents of "classes.dex" which contain the classes of the app, "lib/", "assets/", "res/", or other portions of the content of the APK.

It will be noted that in some cases, some of the features may be modified in a mutated app and still, as a set, the features are generally similar to the features of the host app. Hence, "persistency" in this case should be understood as the set of features as a set generally remaining similar in mutated versions, with potential slight modifications in some and substantial modifications in others. As an example, the splash screen may remain unchanged, the icon may be slightly modified, and the title may be modified to have a similar text string than the original title, while the name of the files in the package may be totally different. As a set of features, the set may be deemed as similar to the original set of features of the host app and hence the features may be deemed as being persistent in the mutated app.

In Step 220, a features repository may be searched based on the features of the app. The features may be used as an approximated positive signature of the host app and allow identification of the host app, which may also be referred to as a reference app. In some exemplary embodiments, the repository may be searched by a server. Additionally or alternatively, a local repository in the device may be searched. In some exemplary embodiments, the set of features may be compared to the set of features retained in the repository to identify the most similar set. In case the similarity measurement is above a minimal threshold, it may be determined that the app is based on the host app. At this state, it may still be undetermined whether the app is the host app itself (or a genuine version thereof in the formal software stream of the host app) or it is a mutated app.

In Step 230, the app may be compared to the host app to determine whether the app is the host app or a mutated app. In some exemplary embodiments, the repository may retain a hash value of the host app (e.g., a hash on the executable itself, a hash on a package containing the executable and additional resources, a hash on an APK, or the like) and such value may be compared with a hash value of the app. In some exemplary embodiments, the hash of the app may be compared with a DB of known valid hashes of the app (in one or more versions). Additionally or alternatively, in case the features are similar but not identical, checking the hash value may not be required as it may be readily understandable that the app is not identical to the host app from which the features were extracted.

In some exemplary embodiments, a copy of the host app may be obtained, such as may be available in the server (e.g. 140 of FIG. 1), in case Step 230 is performed by such server. The app and the host app may be compared in their entirety. For such a comparison, the device performing the comparison may require access to both the host app and to the app undergoing evaluation. In some exemplary embodiments, one of the apps may be an app which alienability is restricted (e.g., an app offered for sale and cannot be transferred from one device to the other). As a result, the device performing Step 230 may require to purchase or otherwise obtain a copy of each app from a distributing source, such as an application repository. Additionally or alternatively, detailed features that were previously collected on top of the features used as the positive signature, may be relied upon for the comparison without having access to the app and/or the host app. In some exemplary embodiments, the device collecting the features for the positive signature may be collect additional features which are used to ascertain whether another app is an exact replica, a different version, or a mutated app of the app.

In some exemplary embodiments, it may be checked whether the app is a different version of the host app (235). In some exemplary embodiments, the different version is likely a new version that was not yet introduced to the features repository but could also be an old version that is not represented by the features repository.

In some exemplary embodiments, version comparison may be performed by taking into account one or more of the following features of both applications: versioning information, vendor identification (e.g., vendor identification in the repository, repository independent vendor identification), and signing certificates. In some exemplary embodiments, a certificate may be used for signing an application prior to uploading the application to the application repository for distribution. The signing certificate may be useful for verifying the authenticity of the declared source of the app and may accordingly be used to determine whether the app under examination was published by the same developer as the identified host app. Different signing certificates may be indicative that the app under examination is not published by the same publisher as the known app and therefore it may be more likely that the app under examination is a mutated app.

In Step 240, an action is performed based on the determination that the app is a mutated app of a host app. In some exemplary embodiments, the action may be an action configured to notify a person of a potential threat or infringements of rights. Additionally or alternatively, the action may be a security action configured to prevent potential malicious activity. Additionally or alternatively, the action may be an analysis action, based thereon one or more additional actions may be performed.

In Step 242, the app may be blocked. The app may not be allowed to be installed and/or executed. In some exemplary embodiments, the app may be put into quarantine. In some exemplary embodiments, the app may be blocked by reducing the access permissions to minimal permissions, such as without permission to alter data, access data external to the app, communicate over the network, or the like.

In Step 244, an alert may be issued. The alert may be issued to the user of the device who installed the app to notify her of the problem. The user may be notified using a notification on the device or using a notification on other devices, so as to avoid the app from detecting and potentially interfering with the notification. Additionally or alternatively, an alert may be issued to an administrator responsible for the user, such as an IT staff member of an organization to which the user belongs. In some exemplary embodiments, the notification may allow for manual decision whether to perform additional actions (e.g., block the app or not).

In Step 246, a delta portion of the mutated app with respect to the host app may be identified and analyzed. In some exemplary embodiments, a portion of the app, referred to as the identical portion, may be determined to be identical in the host app and in the mutated app. The identical portion may be a subset of the bundle of the app that is identical to a corresponding subset of the bundle of a known valid version of the host app.

The remainder portion, also referred to as a delta portion may be a portion of the mutated app which is different than the corresponding portion in the host app. The delta portion may be analyzed to detect functionality in the app that was added on top of or instead of functionality of the host application.

In some exemplary embodiments, the automatic analysis may be to determine whether such elements are useful in introducing malicious activity to the host app, and to deduce a potential risk level from the app. In some exemplary embodiments, some API invocations may be a-priori defined as "sensitive" and usage thereof in the delta portion may be considered as an indicator of potential risk level. For example, API calls that are capable of harvesting or modifying user/corporate information may be considered sensitive. In particular, accessing contact list, recording information, sending text messages or reviewing sent text messages, performing screen capture, or the like. In some exemplary embodiments, in case the delta portion utilizes sensitive API calls that are not used by the identical portion may be a substantive indicator of potential risk level. As an example, if the identical portion frequently accesses the contact list, such an access by the delta portion may present a lower level of risk level than if the identical portion never accesses such information. The analysis may be based on static analysis of the code, dynamic analysis of executed apps, combination thereof, or the like.

In some exemplary embodiments, the difference in Uniform Resource Locators (URLs) between the mutated app and the host app may be examined. As an example, the app may interact with server-side logic that is accessed using a URL and the set of URLs to which each app connects may be compared. A mutated app may differ in the URL the app connects to, for example, in order to persistently intercept communication and data passed through. As another example, an addition of new URLs in comparison to the original app might be a result of leaking information from the app to an attacker's server. In some exemplary embodiments, difference in the URLs may be indicative that the examined app is a malicious mutation of the host app.

In some exemplary embodiments, the difference between declared activities, services, broadcast receivers of the host app and the mutated app may be identified. Additional activities, services, broadcast receivers, permissions, or the like may be indicative of the mutation attempting to gain additional access not required by the known app. Such attempts may indicate that the mutated app is a malicious app.

Figure 3A:
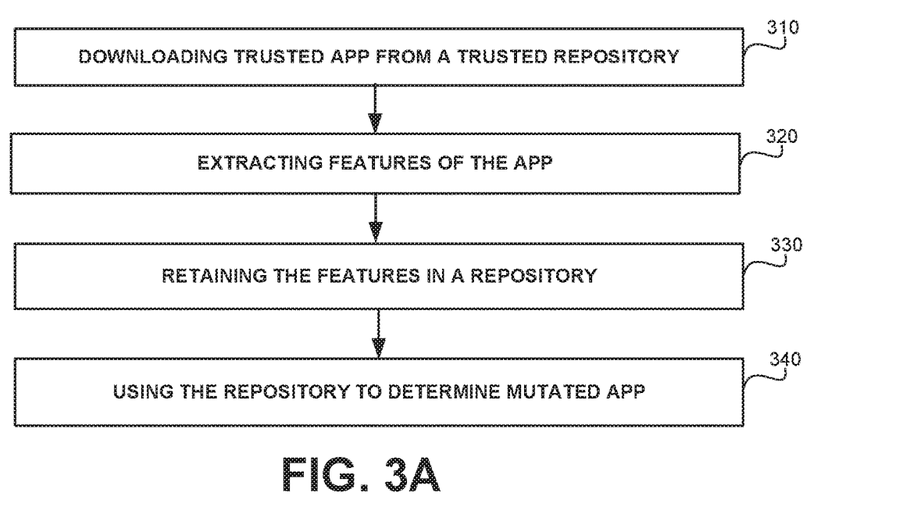
FIG. 3A shows a flowchart diagram of a method, in accordance with some exemplary embodiments of the disclosed subject matter.

Referring now to FIG. 3A showing a flowchart diagram of a method, in accordance with some exemplary embodiments of the disclosed subject matter. In some exemplary embodiments, the method of FIG. 3A may be performed by a server, such as 140 of FIG. 1, or by any device collecting a list of host apps and retaining a repository useful for detecting mutated apps based thereof. Without limiting the disclosed subject matter, and for the ease of explanation, the method is described as being performed by a server.

In Step 310, a trusted repository may be accessed to download trusted apps. In some exemplary embodiments, the server may periodically access trusted apps repositories, such as official repositories of OS vendors to receive information on apps, which can be assumed to be non-mutated and non-malicious. In one example, the server may download every app in the trusted apps repository as it is published in repository and analyze it. Additionally or alternatively, the server may download only popular apps, such as apps having been downloaded over a threshold number of times (e.g., over 200,000 times), trending apps, apps appearing in top charts (e.g., 10 most popular apps in Romania, 50 most popular apps of the month, etc.). In some exemplary embodiments, if an app is downloaded for one operating system (e.g., Android™), counterpart apps of the app may also be downloaded and analyzed for all other operating systems (e.g., Windows Mobile™, iOS™) regardless of whether they meet a minimal threshold, such as a minimal popularity threshold. For example, if the Facebook™ app meets the minimal number of installations threshold for Android™, the Facebook™ app may be downloaded and analyzed for all operating systems, including, for example iOS™ in which the counterpart app may not be as popular.

On the following steps, the downloaded apps may be analyzed by the server and added to a list of potential host apps. In some exemplary embodiments, a database may be used to retain for each such potential host app, a record indicating relevant identifying information and information useful for differentiating the app with a mutation of the app. In some exemplary embodiments, the server may extract the features from the downloaded app (Step 320) and retain the features in a repository (Step 330). In some exemplary embodiments, the repository may retain in addition to the features of the app, a link allowing access in the future to content of the app, such as the app binary, the app bundle, or the like.

In Step 340, the repository may be used to detect a mutated app that is based on a host app, such as is depicted in FIG. 2. In some exemplary embodiments, the server may be provided with an App Under Check (AUC) or features thereof, and the server may search for a potential host app using the repository. In some exemplary embodiments, the server may compare the AUC and the host app to determine whether the AUC is a mutated app, the host app or a new version thereof. Additionally or alternatively, the repository may be used by other devices, such as other servers, client device having a local copy or local partial copy of the repository, or the like. In some exemplary embodiments, the repository may comprise information regarding apps in different operating systems. A local repository may filter information that are not relevant to the user or to the device, such as apps of other operating systems, apps that are popular in other regions but not to the local region of the user or of the device, or the like.

Figure 3B:
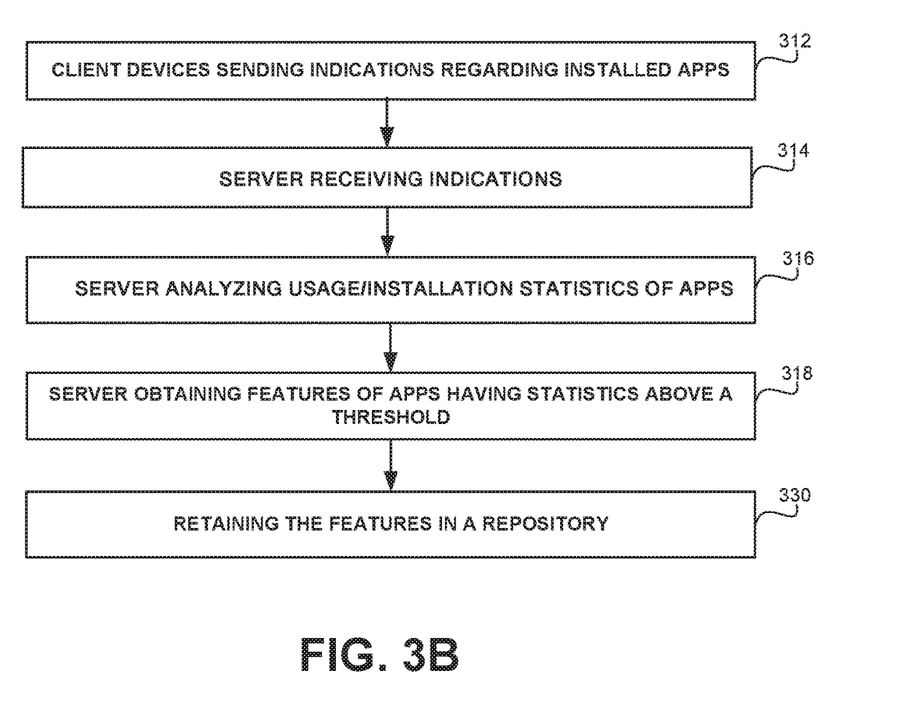
FIG. 3B shows a flowchart diagram of a method, in accordance with some exemplary embodiments of the disclosed subject matter.

Referring now to FIG. 3B showing a flowchart diagram of a method, in accordance with some exemplary embodiments of the disclosed subject matter. The method of FIG. 3B may exemplify a method of using crowdsourced information to compile a list of potential host apps. In some exemplary embodiments, crowd sourcing may be utilized to create a database of valid apps which may potentially be used as host apps.

In Step 312, client devices, such as 120 and 130 of FIG. 1, may send indications regarding installed apps. In some exemplary embodiments, the client devices may have installed thereon an agent, such as an app, an SDK within an app, or the like. The agent may transmit indications as to installed apps. As an example, the agent may transmit identifying information on the apps, such as a Cyclic Redundancy Check (CRC) code of their executable files, a hashing value of the app bundle or portion thereof, or the like. In some exemplary embodiments, the indications may be sent regarding apps that are used, or apps which exhibit a predetermined minimal usage threshold, such as being used monthly, or the like. In some exemplary embodiments, the indications may be sent periodically, such as once a week. In some exemplary embodiments, the indications may be comprehensive, such as repeating previously provided indications (e.g., re-sending an indication regarding Facebook™ app if such app is still installed). Additionally or alternatively, incremental indications may be sent, such as indicating a change in the reported apps (e.g., removing uninstalled apps, removing apps not reaching a minimal usage threshold, adding new apps, adding apps that previously did not meet the minimal usage threshold, or the like).

In Step 314, a server, such as 140 of FIG. 1, may receive indications from many devices as to which applications are installed thereon.

In Step 316, the server may analyze the collected information received from the devices. In some exemplary embodiments, aggregated statistics may be performed based on the indications received from a plurality of devices. In some exemplary embodiments, it may be assumed that an application which is installed on or used by many devices (such as over 10,000 devices, 50,000 devices, over 5% of the devices, or the like) may be a potential host app.

In some exemplary embodiments, based on receiving enough indications, the server may wish to update a repository to include records relating to the potential host app. In Step 318, features of the potential host apps may be obtained to be stored in a repository (Step 330). In some exemplary embodiments, the potential host apps may be analyzed by an agent on behalf of the server. Additionally or alternatively, several agents may be asked to analyze the potential host app in order to avoid being influenced by a malicious device. Additionally or alternatively, an agent may transmit the potential host app to the server to allow the server to perform the feature extraction itself.

In some exemplary embodiments, using crowdsourcing may be useful to overcome a problem of accidentally detecting a new version of an app as a mutated app. At the beginning, a new version may be similar to an old version and therefore may be detected to be a mutation thereof. However, the new version may spread rapidly and by analyzing its trending affect, it may be determined that the new trending mutation is a version of a potential host app and not a mutated app. In some exemplary embodiments, the new version may be identified relatively quickly and added to the list of potential host apps, even if such app has not been uploaded to a trusted repository. In some exemplary embodiments, additional measures may be used in combination with the trending analysis, such as analyzing developer fingerprint (e.g., analyzing signing certificate) in order to determine whether the same developer released the new app (i.e., less likely to be mutated app) or a different developer (i.e., more likely to be mutated app).

Figure 4:
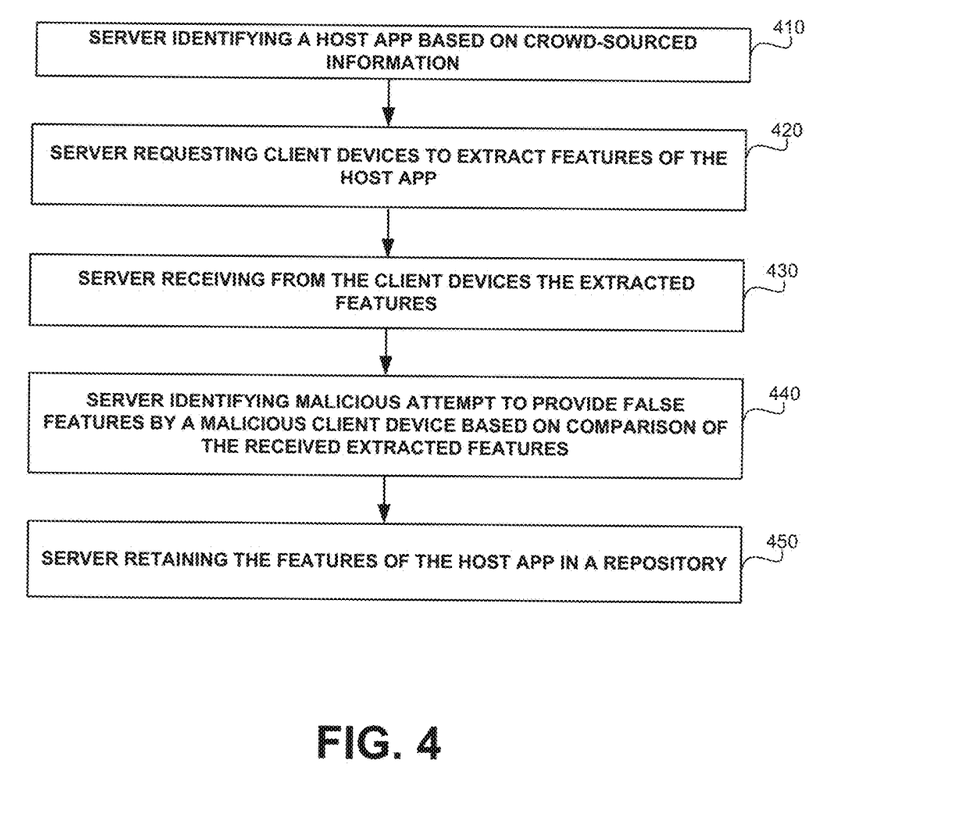
FIG. 4 shows a flowchart diagram of a method, in accordance with some exemplary embodiments of the disclosed subject matter.

Referring now to FIG. 4 showing a flowchart diagram of a method, in accordance with some exemplary embodiments of the disclosed subject matter.

In Step 410, a server may identify a potential host app based on crowd-sourced information, such as without limitation, in a manner depicted in FIG. 3B.

In Step 420, the server may request client devices to extract features of the host app on its behalf. The server may not be able to extract features itself as it may not have access to the app, the app bundle or the like. In some exemplary embodiments, the app may not be alienable such as in case of a purchased app which is protected by DRM, and therefore the client may be not be able to upload the app to the server. Additionally or alternatively, it may be desired to avoid consuming network bandwidth by the client or by the server.

In Step 430, the server may receive from the client devices the extracted features. In some exemplary embodiments, the server may receive redundant information such as duplicate sets of values to the features of a same app.

In Step 440, the server may compare sets of values of the same app received from different devices. In some exemplary embodiments, the server may use the potentially redundant information to identify a malicious attempt to provide false features by a malicious client device. In some exemplary embodiments, a quorum-based voting may be applied to select the correct values of the features between a set of different alternative values provided by different devices.

In Step 450, the server may retain the selected features of the potential host app in a repository to be used to identify mutated apps.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A method performed by a processor, wherein the method comprises:
    obtaining features of an Application Under Check (AUC);
    matching the AUC with a host application, wherein the host application is matched from a repository of applications that are a-priori known to be legitimate applications, wherein said matching comprises comparing the features of the AUC with sets of features of applications to determine the host application of the AUC;
    determining an identical portion of the AUC and a remainder portion of the AUC, wherein the identical portion is identical to a corresponding portion in the host application, wherein the remainder portion of the AUC is not identically included in the host application;
    analyzing the remainder portion to detect different functionality between the AUC and the host application;
    in response to said matching, determining that the AUC is a mutated application of the host application, wherein the mutated application is a variation of the host application, wherein the mutated application is a non-legitimate application, wherein said determining comprises comparing a signature of the AUC with a signature of the host application; and in response to said determining that the AUC is a mutated application, performing a predetermined action.

2. The method of claim 1, wherein the AUC is obtained from a non-trusted application repository.

3. The method of claim 1, wherein the sets of features of applications are retained in a database, wherein the database is updated based on one or more trusted application repositories.

4. The method of claim 1, wherein the sets of features of applications are retained in a database, wherein the database comprises information relating to applications installed on crowdsourced devices.

5. The method of claim 4, wherein the database comprises information relating to popular applications based on installation information from the crowdsourced devices.

6. The method of claim 1, wherein the mutated application is configured to perform a malicious activity that is not included in the host application.

7. The method of claim 1, wherein the mutated application overrides a Digital Rights Management (DRM) mechanism present in the host application.

8. The method of claim 1, wherein the mutated application replaces a module of the host application by a second module.

9. The method of claim 1, wherein the features of the AUC comprise one or more of the following features:
    a title of the AUC;
    an icon of the AUC;
    a splash screen content of the AUC;
    a look and feel indicator of the AUC;
    a name of a file in a distribution of the AUC;
    content of a file in a distribution of the AUC, or hash value thereof; and
    a resource comprised by a distribution of the AUC.

10. The method of claim 1 further comprises:
    determining that the mutated application is a different version of the host application, wherein said determining comprises: comparing, between the host application and the AUC at least one of the following:
    versioning information;
    vendor identification; and
    signing certification.

11. The method of claim 1, wherein the features of the AUC comprise a User Interface (UI) layout of the AUC.

12. A server being connected to a network, wherein the server comprises:
    a memory; and
    a processor adapted to perform the steps of:
        collecting features relating to trusted applications, wherein the trusted applications are potentially useable as a basis for a mutated application, wherein the mutated application is a variation of a host application selected from the trusted applications, wherein the mutated application is a non-legitimate application, wherein the features are features that are indicative of mutated versions of the trusted applications;
        retaining the features in a repository, whereby collecting and retaining a list of positive signatures of trusted applications that are useful to approximately identify a host application of a mutated application, whereby enabling the use of a collection of trusted applications to be used as an indication that an application under check (AUC) is a non-legitimate application, wherein the indication is matching the application under check with a trusted application;
        determining an identical portion of the AUC and a remainder portion of the AUC, wherein the identical portion is identical to a corresponding portion in the host application, wherein the remainder portion of the AUC is not identically included in the host application; and
        analyzing the remainder portion to detect different functionality between the AUC and the host application.

13. The server of claim 12, wherein said collecting comprises:
    downloading the trusted applications from one or more trusted application repositories; and
    extracting the features from the downloaded trusted applications.

14. The server of claim 12, wherein said collecting comprises:
    obtaining indications from a plurality of computing devices relating to applications that are installed on the plurality of computing devices;
    identifying one or more applications that have a statistical measurement above a predetermined threshold, wherein the identified one or more applications are the trusted applications; and
    obtaining the features of the trusted applications.

15. The server of claim 14, wherein said obtaining the features of the trusted applications comprises: receiving from a computing device the features, wherein the computing device extracts the features from the trusted application installed thereon.

16. The server of claim 14, wherein said obtaining the features of the trusted applications comprises:
receiving from one or more additional computing devices the features, wherein the one or more computing devices extract the features from the trusted application installed thereon, wherein a malicious attempt to provide false features is detectable; and
selecting from the obtained features of a same trusted application.

17. The server of claim 14, wherein at least a portion of the applications are purchased applications and are restricted from being transferred to another device.

18. A computer program product comprising a non-transitory computer-readable storage medium retaining program instructions, which program instructions when read by a processor, cause the processor to perform the following:
obtain features of an Application Under Check (AUC);
match the AUC with a host application, wherein the host application is matched from a repository of applications that are a-priori known to be legitimate applications, wherein the matching comprises comparing the features of the AUC with sets of features of applications to determine the host application of the AUC;
determine an identical portion of the AUC and a remainder portion of the AUC, wherein the identical portion is identical to a corresponding portion in the host application, wherein the remainder portion of the AUC is not identically included in the host application;
analyze the remainder portion to detect different functionality between the AUC and the host application;
in response to matching the AUC with the host application, determine that the AUC is a mutated application of the host application by comparing a signature of the AUC with a signature of the host application; and
in response to said determining that the AUC is a mutated application, perform a predetermined action.

19. An apparatus comprising the processor and a memory, said memory retaining the program instructions of claim 18.

* * * * *